March 14, 1944.   A. B. SIMMONS   2,344,481
ENGRAVING MACHINE
Filed April 11, 1942   6 Sheets-Sheet 1

Fig. 1

Arthur B. Simmons
INVENTOR
BY
ATTORNEYS

March 14, 1944.  A. B. SIMMONS  2,344,481
ENGRAVING MACHINE
Filed April 11, 1942  6 Sheets-Sheet 2

Arthur B. Simmons
INVENTOR

BY
ATTORNEYS

Patented Mar. 14, 1944

2,344,481

UNITED STATES PATENT OFFICE 2,344,481

ENGRAVING MACHINE

Arthur B. Simmons, Rochester, N. Y., assignor to Eastman Kodak Company, Rochester, N. Y., a corporation of New Jersey Application April 11, 1942, Serial No. 438,640

22 Claims. (Cl. 33—25)

This invention relates to engraving machines and more particularly to the construction of engraving machines with which extremely accurate engravings may be made. It further relates to a machine particularly designed to remove small areas of a thin wax coating from a glass plate which is to be engraved so that the wax coating may protect the plate from an etching fluid permitting the fluid to reach the part being etched only through the lines, symbols or the like, which have been cut through the wax coating.

It has been extremely difficult in the past to provide a machine which is sufficiently free from vibration and from unnecessary play in the bearings to produce fine lines which may be extremely close together and which may contain letters, patterns, figures, or symbols which are extremely small in size, because the slightest vibration in any of the parts is sufficient to spoil work. It has been customary to use pantographs so that an operator would move a stylus over a master plate of considerable size, the pantograph reducing the movement of an engraving tool to a desired extent. However, it has been extremely difficult to reduce the vibration and bearing movement in such pantographs sufficiently to permit the desired degree of accuracy in work. This is particularly true where a comparatively large number of work pieces are to be engraved at one time.

One of the objects of my invention is to provide a pantograph operated engraving machine in which a large number of pieces of work may be accurately engraved at one time. Another object of my invention is to provide a machine of the class described in which friction between all the moving parts and a supporting frame is largely eliminated or at least reduced to a minimum. Another object of my invention is to provide a machine in which extremely accurate bearings are provided between the relatively movable links of a pantograph so as to greatly minimize play between the relatively pivoted members. Another object of my invention is to provide an engraving machine in which a large number of workpieces may be simultaneously engraved and in which the effort required to move the engraving tools is reduced to a minimum. Still another object of my invention is to prevent vibrations of a building in which the engraving machine may be mounted from effecting the quality of workmanship of the engraving machine. Other objects of my invention will appear from the following specification, the novel features being particularly pointed out in the claims at the end thereof.

Coming now to the drawings wherein like reference characters denote like parts throughout.

My invention includes a pantograph structure in which bearing play is reduced or eliminated by providing special bearings all lying in a single plane. By preventing the pantograph links from turning and by forming the bearings of hardened steel balls, bearing difficulties have been largely overcome.

Figure 3:
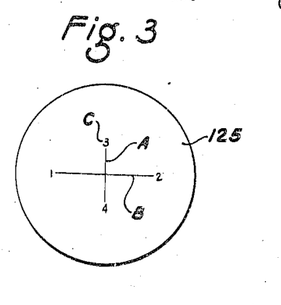
Fig. 3 is a top plan view of a typical workpiece which has been engraved, this part being shown on a considerably magnified scale.

In order to give some idea as to the nature of the work which can be accomplished on my machine, I might point out that a typical piece of work may consist of a glass disc 1⅜ of an inch in diameter and 3/32 of an inch in thickness and this disc may have a pattern engraved thereon such as that shown in Fig. 3 or of any other desired pattern.

Referring to Fig. 3, the engraved lines marked A and B may be from .0005" to .0007" in width and the reference character C may be .0025" in height. It is to be distinctly understood that these figures are merely examples of a typical workpiece and are by no means to be considered a limitation. It is much easier to engrave larger size workpieces with wider lines and it is considerably more difficult to reduce the size of the work over that suggested in the typical example.

Broadly speaking, my engraving machine consists of a stylus 1, which may be supported by a plurality of links forming a pantograph referred to broadly as 2, this pantograph causing a series of engraving tools 3 to move relatively to a series of work pieces 4 to reproduce on each workpiece a pattern 5 from a master plate 135 which is of many times the size of the finely engraved workpieces. For instance, I find that it is often convenient to move the stylus 1 a distance 20 to 25 times as great as the distance that the workpieces moved in the engraving operation.

Figure 1:
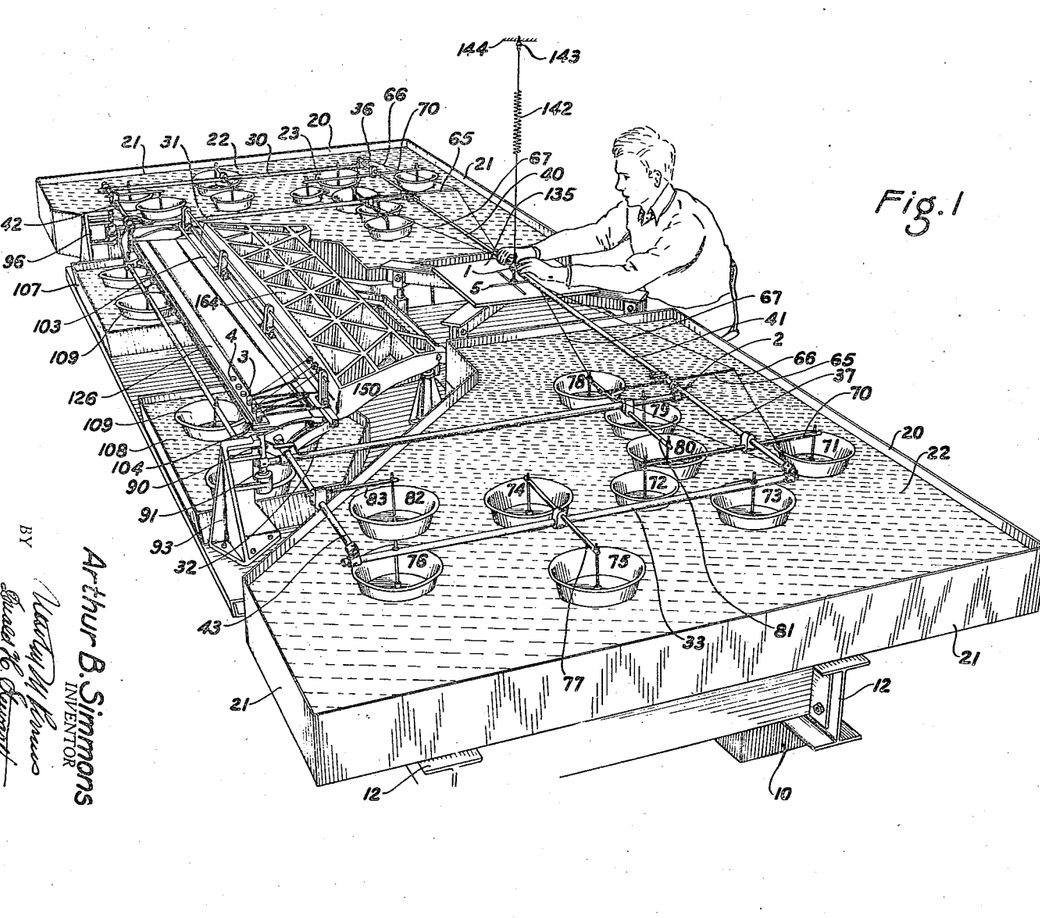
Fig. 1 is a perspective view of an engraving machine constructed in accordance with and embodying a preferred form of my invention, certain parts being omitted for the sake of clearness.
Figure 13:
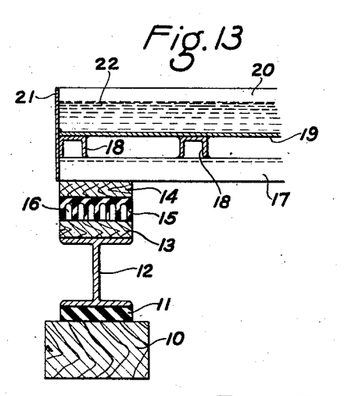
Fig. 13 is a fragmentary detail section showing a portion of the vibration controlling support.

When the engraving is as fine as mentioned above, it is necessary to reduce all play between parts to a minimum; it is necessary to reduce friction between the moving parts to a minimum; and it is extremely necessary to reduce vibration to a minimum. In order to accomplish these ends I have provided a machine, a typical example of which will now be described. Referring to Fig. 13, I provide a support which will absorb building vibrations, this support preferably consisting of a number of blocks 10, which may support rubber pads 11 on which I-beams 12 may rest, these I-beams supporting blocks 13 and 14 separated by a rubber pad 15 which may have a series of grooves 16 to make the pad more resilient. On top of the blocks 14 there are transverse channel members 17 across which transverse channel members 18 may pass, these channel members being welded together to form a rigid support. Above the channel members 18 are welded plates 19 which may form the bottom of the tanks 20, the edges of these tanks being formed by the plates 21. Since Fig. 13 shows one corner of one of the main tanks 20 of which there are two, it can readily be seen that the structure supporting these tanks is an extremely rigid one and that the corner supports are built to absorb as much vibration as possible. The two main tanks 20, as shown in Fig. 1, are partially filled with a fluid medium such as oil 22, although of course water could be used, but water is more susceptible to evaporation and to transmitting vibrations than is a comparatively light oil. These tanks support a plurality of pantograph floats designated broadly as 23.

Figure 14:
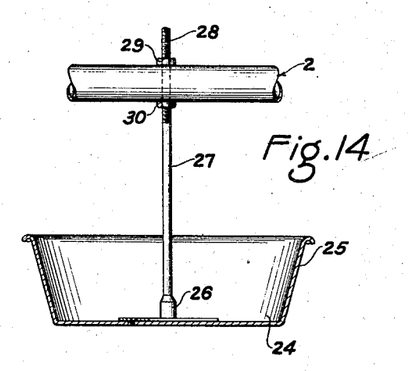
Fig. 14 is a fragmentary detail partially in section showing a pantograph linkage float.

Each of the floats, as best shown in Fig. 14, may consist of a circular or other shape element 24 having relatively high sides 25 and supporting at 26 an upwardly extending rod 27 threaded at 28 and carrying two nuts 29 and 30, one on each side of a pantograph link broadly designated at 2. Some of the pantograph links carry quite a number of these floats, whereas other links may have only one float, the floats being arranged to properly support all of the links.

Figure 5:
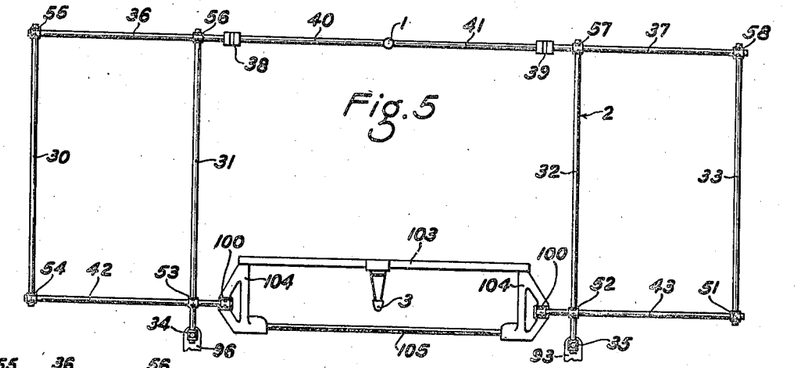
Figs. 5, 6 and 7 are all diagrammatic views showing the pantograph linkage in different positions which it may assume in engraving work. The movements shown in Figs. 6 and 7 are on a considerably exaggerated scale, since the maximum movement of the linkage is comparatively slight with respect to the length of the various links.
Figure 6:
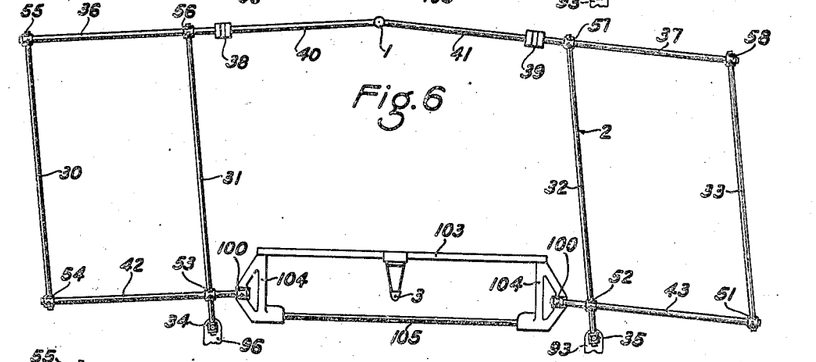
Figure 7:
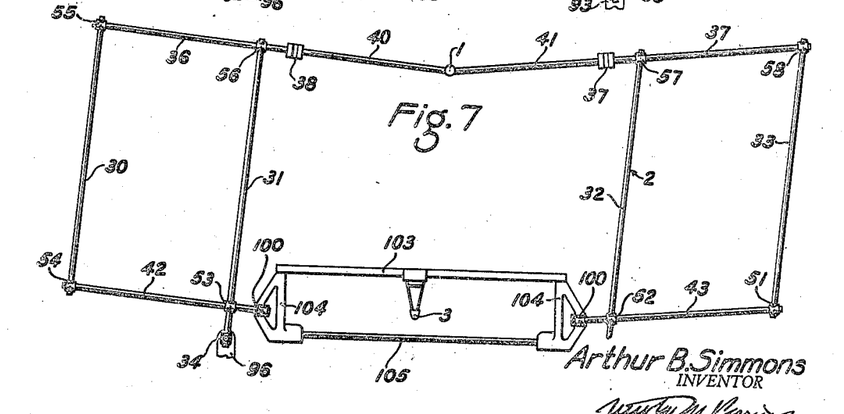
Figure 15:
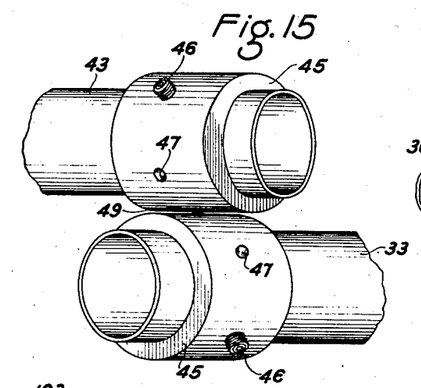
Fig. 15 is a perspective detail showing a pivotal connection between a pair of pantograph links.
Figure 18:
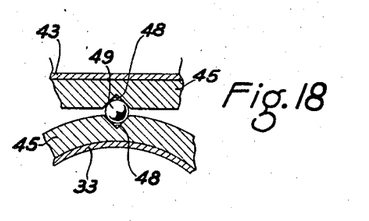
Fig. 18 is a fragmentary sectional view showing a pivot between two pantograph links.

The pantograph as indicated especially in Figs. 5 to 7 may consist of a plurality of links pivotally supported and so arranged that by moving the stylus 1, the engraving tools 3 may be moved through the same pattern and to much less extent. In the present instance the pantograph may comprise a series of transverse links 30, 31, 32 and 33, links 31 and 32 being pivotally mounted at 34 and 35 to the frame of the machine so as to be hingedly attached thereto. The stylus 1 is preferably carried by a connecting link which may be composed of the sections 36 and 37 which are hingedly attached at 38 and 39 to the link members 40 and 41. As will be more fully described later, the hinge elements 38 and 39 permit the stylus 1 to be moved vertically without affecting the movement of the linkage 31, 32, 36 and 37 because this movement of the stylus may be comparatively slight—say ⅛ inch. The transverse links 30, 31, 32 and 33 are connected by connecting links 42 and 43 and between all of the transverse links there are pivotal connections of a special construction best shown in Figs. 15 and 18. For instance, Fig. 15 shows a typical hinge connection between links 43 and 33. Each of these links is formed of thin, light-weight tubular material such as thin aluminum tubes. Each of the tubes is provided with a sleeve 45 through which a setscrew 46 passes, this setscrew being adapted to hold the sleeve 45 in the desired position. The sleeves are preferably equipped with holes 47 to facilitate assembling the sleeves in the proper position and each sleeve, as indicated in Fig. 18, is provided with a carefully formed V-shaped (in cross section) countersunk portion 48. These two countersunk portions are vertically arranged and a steel ball 49 is held in place merely by the weight of the link 43 resting on the link 33. Thus, each pivotal connection consists of a single steel ball so that this eliminates any play between the two pivoted links. While I have described only one pivotal connection as illustrated in Fig. 15, it is to be understood that the same type of connection is provided at each of the corners shown in Fig. 5 and numbered 51, 52, 53, 54, 55, 56, 57 and 58.

Figure 16:
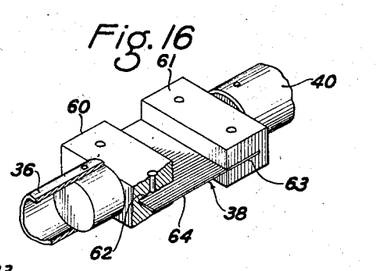
Fig. 16 is a fragmentary perspective partially in section showing a flexible connection between a portion of two sections of a pantograph connecting link.
Figure 17:
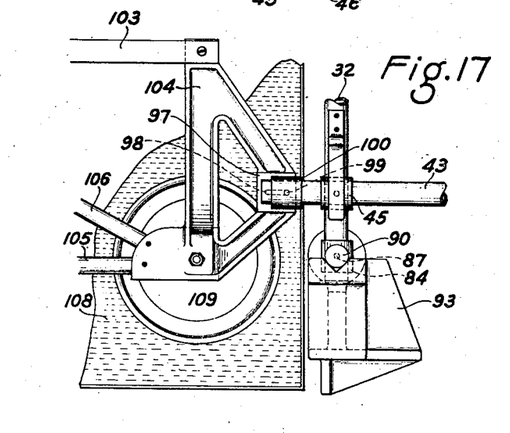
Fig. 17 is a fragmentary plan view showing a portion of the engraving tool carrier and associated parts.

It should be noticed that the connecting link holding the stylus 1 is made up of a series of sections and that hinges 38 and 39 are provided between these sections. These hinges are identical and, as shown in Fig. 16, they consist of blocks 60 and 61 attached to the links such as 36 and 40, these blocks being grooved at 62 and 63 to support the hinged member which consists of a thin, metal plate 64. This plate is capable of moving to permit the stylus 1 to be raised or lowered a short distance, but it cannot turn transversely of the plate 64. This is particularly true because it will be noticed from Fig. 1 that each of the sections 36, 40, and 41, 37 are provided with a bracing which consists of transverse rods 65 passing through the links 36 and 37 and a pair of wire braces 66 and 67 connected both to the rods 36 and 37 and to the rods 40 and 41. Thus, this bracing also prevents sidewise lateral displacement of the connecting member links which is very essential when fine work is to be done. The braces also prevent even the very slight springing of the tubular links which conceivably might occur without the braces.

It should be noticed that the arrangement of floats is such that the links 36 and 37 cannot readily turn because of the transverse rods 70 which support spaced floats 71 and 72 so that the links 36 and 37 are held in a horizontal position.

The floats supporting the links 30 and 33 are alike in that each of these links utilizes four floats 73, 74, 75 and 76, floats 74, and 75 also being supported by a transverse rod 77 so that these links will be floated in a horizontal position. Links 31 and 32 are each provided with a similar arrangement at one end, there being three floats 78, 79 and 80, floats 78 and 80 being supported by a transverse rod 81.

The short connecting links 42 and 43 are primarily supported by the transverse links but I have found it desirable to provide a single float 82 carried by a rod 83, since this prevents the links 43 and 42 from tending to rotate.

Figures 8, 9, 10:
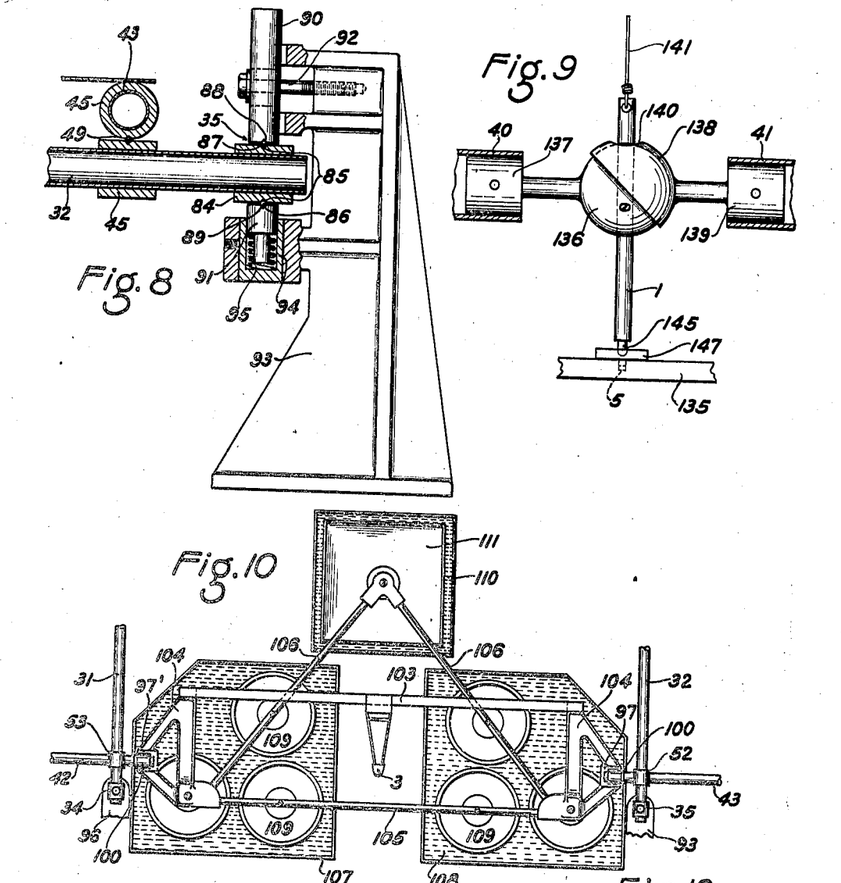
Fig. 8 is a fragmentary detail partially in section showing a pivotal support for certain links and a pivotal connection between other links.
Fig. 9 is a fragmentary detail showing the stylus carrier.
Fig. 10 is a fragmentary top plan view showing a portion of the engraving tool carrying and supporting structure.
Figure 12:
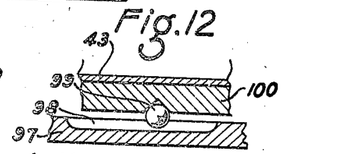
Fig. 12 is a fragmentary sectional view through a pivot supporting a portion of the pantograph linkage.

The hinge connections of the transverse links 31 and 32 with the machine frame at 34 and 35 are important and are shown in detail in Fig. 8. In this figure it will be noticed that the link 32 carries a collar 84 with V-shaped counter sunk portions 85 spaced vertically with respect to each other to support steel balls 86 and 87 which rest in the V-shaped counter-sunk portions 88 and 89 in the bearing rods 90 and 91. Rod 90 is fixedly attached by the bolt 92 to the frame 93 and rod 91 is slidably attached in the cup member 94 which contains a spring 95 to thrust upwardly on the bearing rod 91. Thus, the upward force of this spring keeps the two balls 86 and 87 in position and a very delicate hinge is thus formed. The second frame support 96 which carries the hinge connection 34 is exactly like the showing of Fig. 8. As indicated in Fig. 12, the lower bearing block 97, which is secured to the end member 104 adjacent the pivot 35, is provided with a V-shaped groove 98 for the lower bearing ball 99 so that the sleeve 100, which positions the ball 99, may have extremely slight lateral movement as the ball 99 moves in the groove 98 which is of an extent sufficient to take care of the difference in position between the ends of the links 42 and 43 which occurs in moving the pantograph and the engraving tool. The bearing block 97', which is secured to the end member 104 adjacent the pivot 34, is provided with a counter-sunk portion similar to 98, as shown in Fig. 12, for receiving a ball upon which the sleeve 100 rests.

Figure 2:
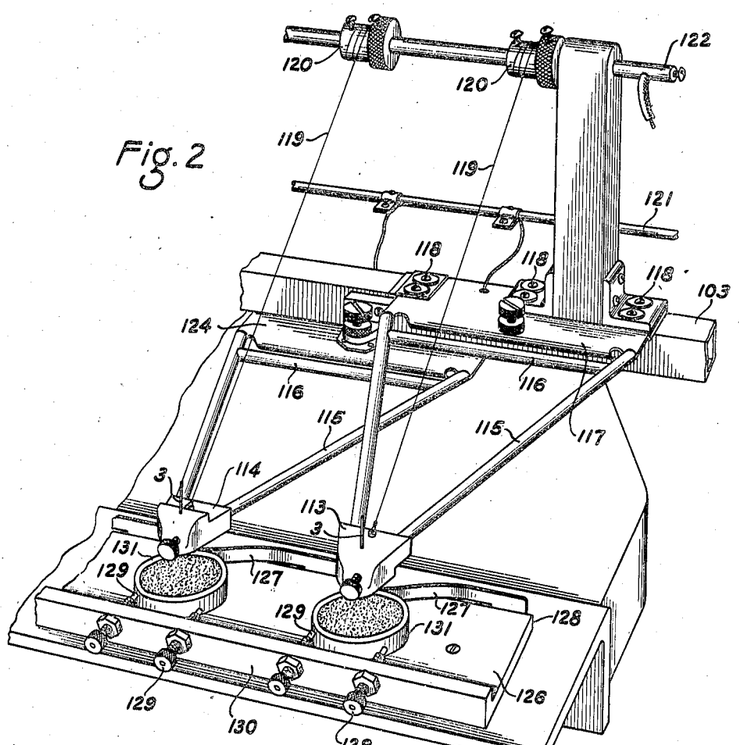
Fig. 2 is a perspective view of a portion of the work holding andl engraving tool supporting mechanism used with the engraving machine shown in Fig. 1.

The engraving tools 3, as best shown in Fig. 2, are carried by a frame 103, best shown in Figs. 5–7 and 17. The frame 103 includes end members 104 and connecting rods 105 and 106 which, as best shown in Fig. 10, are supported by three sets of floats in three tanks. The tanks 107 and 108 each carries three floats 109 and the tank 110 carries a single float 111 all of these floats being connected to the frame or supporting members as indicated in Fig. 14. It should be noticed that the floats are of different shapes and sizes, as also are the tank members, these being selected purely for the sake of convenience and for supporting the required weight. While it would no doubt be possible to make a machine with a single tank, I find it much more convenient to provide a plurality of tanks as indicated in the present embodiment of my invention.

The engraving tool-holding frame preferably supports a large number of engraving tools—in the present embodiment 30 may be used. Since each pair of engraving tools is exactly alike, I will describe only one pair specifically, a typical pair being illustrated in Fig. 2.

The engraving tools are supported by castings 113 and 114 and each of these castings is provided with light triangular supports 115 preferably made of rigid tubing having welded crossbars 116. The right-hand engraving tool carrier shown in Fig. 2 is supported by a leaf spring 117 which is rigidly attached by means of screws 118 to the top of the frame bar 103. Thus the spring 117 may flex when the wire 119, which is attached to the casting 113 at one end and to a supporting disk 120 at the opposite end, changes in length. This change in length is made by passing an electric current through a circuit including the bar 121 and the bar 122 through the wire 119, the heat altering the length of the wire a sufficient distance to raise and lower the engraving tool 3 to and from the workpiece 125. The specific means for raising and lowering the engraving tool 3 forms no part of the present invention and is not claimed herein. It is fully illustrated and described in the copending application Serial No. 438,301, filed April 1, 1942, in the name of Daniel B. McRae and entitled "Engraving machine." This application resulted in Patent No. 2,327,811 granted August 24, 1943.

The left-hand engraving tool referring to Fig. 2 differs from the right-hand tool in that the triangular frame is attached to a spring plate 124 which is attached to the bottom of the frame bar 103. Otherwise, the structure is just the same as this tool may be raised and lowered against spring pressure by the wire 119 in exactly the same manner as the first tool.

It will be noticed from Fig. 10 that the entire frame, of which bar 103 is a part, is mounted to be moved when the stylus is moved and consequently all of the engraving needles 3 are moved at the same time and by the same mechanism.

The workpieces 125 are held stationary on a worktable 126 a portion of which is shown in Fig. 2. This table is provided with spring members 127 along the rear edge 128, these spring members tending to thrust the workpieces 125 forwardly against a pair of setscrews 129 which pass through the upstanding flange 130. These setscrews can, of course, be moved to initially set the workpieces in their proper position with respect to the engraving tools 3.

Figure 4:
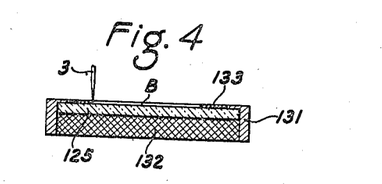
Fig. 4 is a section through a workpiece in condition to be placed on the supporting mechanism and showing a portion of an engraved line thereon.

Before the workpiece 125 is mounted on the work table 126 it is placed in a flanged ring 131 as indicated in Fig. 4, being backed up by a thick layer of wax 132. On the upper surface of the workpiece there is a thin layer of wax 133 and it is this wax coating which is displaced by the engraving tool 3 to make the mark as indicated at B. After the design has been cut through the wax coating 133 the workpieces are subjected to a suitable etching fluid such as hydrofluoric acid gas.

Figure 19:
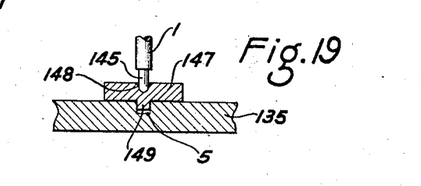
Fig. 19 is a detail sectional view through a master engraving plate, stylus and stylus slide.

The design which is to be engraved on the workpiece 125, as for instance the design shown in Fig. 3, is formed in a master plate on a greatly magnified sketch. Referring to Fig. 1, it will be noticed that the master plate 135 is provided with slots 5 which are carefully laid out in the proper pattern. The stylus may be as shown in Fig. 9 where the rod 1 forms the stylus member, this rod passing through a ball 136 which is carried by a plug 137 riveted to the connecting link 40. Partly surrounding the ball 136 is a semi-spherical shell 138 which is attached to a plug 139 carried by the connecting link 41. This semi-spherical member is provided with an aperture 140 which permits relative movement between the ball 136 and socket 138. Extending upwardly from the stylus 1 is a spring support 141 which, as shown in Fig. 1, may include a spring section 142 which is attached at 143 to the ceiling 144 or to any other suitable support. The spring support 142 is just strong enough to almost counterbalance the weight of the transverse links 40 and 41 which must be raised slightly when the point or end 145 of the stylus is raised from the master plate 135, which, as above explained, is grooved in the proper pattern at 5 or from a slider 147 which may be used and which is better shown in Fig. 19. As shown in this figure, the point 145 of the stylus 1 may engage an aperture 148 in the slider, this slider having a web 149 to engage and slide in the groove 5 in the master plate 125.

It is not always necessary to use a slider 147 between the stylus point and the master plate but it has been found desirable to use a slider in any pattern where two lines cross each other, because there is always a tendency for the stylus point to engage the groove and, where grooves cross, to slightly follow into one of the cross grooves. However, if a slider 147 is used with a web 149 of appreciable length—instead of a spherical point like the point 145 of the stylus 1—the web will pass over any cross cuts in the master plate making a smooth and even stroke. However, if desired, the slider may be omitted. In fact, a slider is very often omitted particularly where a number of master plates are used one after the other to produce portions of a single pattern engraved on a workpiece. For instance, if desired, one master plate might be used for the lines shown at A in Fig. 3 and a second master plate might be used for the lines shown at B. If this type of master plate is used there would be no tendency for the stylus to follow any but the single line appearing in the plate and consequently no slider would be required.

Figure 11:
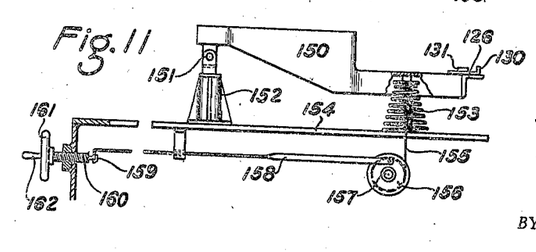
Fig. 11 is a fragmentary detail showing the work table adjusting mechanism.

The workpieces mounted in the flanged rings 131 are, as above explained, mounted on the work table 126. This work table 126 must of course be very rigidly made and its construction is more fully shown in Fig. 11. As shown in this figure, it will be noted that the work table 126 lies across a relatively heavy frame member which includes heavy end frames 150 which are pivoted at 151 to supports 152 and which at their forward ends are supported on springs 153 carried by a frame member 154. The springs tend to thrust the end frame members 150 upwardly but this upward movement is prevented by a cable 155 passing around a pulley 156 pivoted at 157 to the frame member. This pulley can be turned by a strap 158 which is attached at one end 159 to the end of a screw 160 which may be turned by a wheel 161 preferably provided with a handle 162. By turning this handle, the work table 126 may be moved to the proper position for any desired setup of the engraving tools.

The end frames 150 are preferably connected by heavy webbing 164 to make the work table as rigid as possible because of course any vibration in this part would permit one or more workpieces to vibrate and thus cause poor workmanship. (Fig. 1.)

The operation of this machine is actually quite simple after the initial setup has been made. Assuming that the work table has been properly positioned and that all the engraving tools are properly positioned, the flanged rings 131 are all set beneath the engraving tools 3 by placing them between the springs 127 and the previously adjusted setscrews 129. This can be done comparatively rapidly, and the twenty-five or thirty workpieces can be readily positioned.

The operator then places the stylus 1 in a slot 5 in the master plate and lowers the engraving tools 3 into contact with the workpieces, the tension in the springs 124 and 117 being sufficient to press engraving tools through the upper coating of the wax 133. The operator then moves the stylus through the groove forming the pattern and this movement on a much reduced scale provides one or more grooves in the wax coating 133 corresponding to the pattern on the master plate 135. If the pattern is an intricate one, a number of master plates may be used without disturbing the workpieces at all. Each time the engraving tool is to be moved from one slot to another to produce a different portion of the character such as the numeral C shown in Fig. 3, the operator raises the engraving tools a short distance such as .025", this movement taking place smoothly and slowly as the wires 119 are heated electrically. The specific way this is done is described in the copending application above referred to.

In moving the stylus 1 it should be noticed that each time the stylus needs to be raised the hinged elements 38 and 39 of the connecting link readily flex a sufficient amount to permit the necessary stylus movement. However, there is no side deflection of the connecting link because of the bracing structure shown in Fig. 1 which includes the transverse rods 66 and the guy wires 65. Thus, while the stylus may move vertically a short distance without disturbing the links, any other movement of the stylus causes the links to move. Referring to Fig. 5, if the stylus 1 is moved upwardly with respect to Fig. 6, the links will assume the position shown in this figure. However, this figure shows a stylus which has been moved both up and to the left with regard to Fig. 5; whereas in Fig. 7 the stylus has been moved down and toward the right. The movement of the stylus in Figs. 5 to 7, inclusive, is greatly exaggerated with respect to the length of the links as actually the stylus ordinarily moves less than fifteen inches; whereas the stylus connecting links 41 and 37 may be, in the embodiment of my invention described, 5 or 6 feet long. In any event the entire carriage carrying the engraving tools 3 is moved through the same pattern as the stylus except that it is on a greatly reduced scale. With the machine above described it is thus possible to produce thirty workpieces which are simultaneously engraved and which may be then treated with a desired etching fluid.

Figures 20, 21, 22:
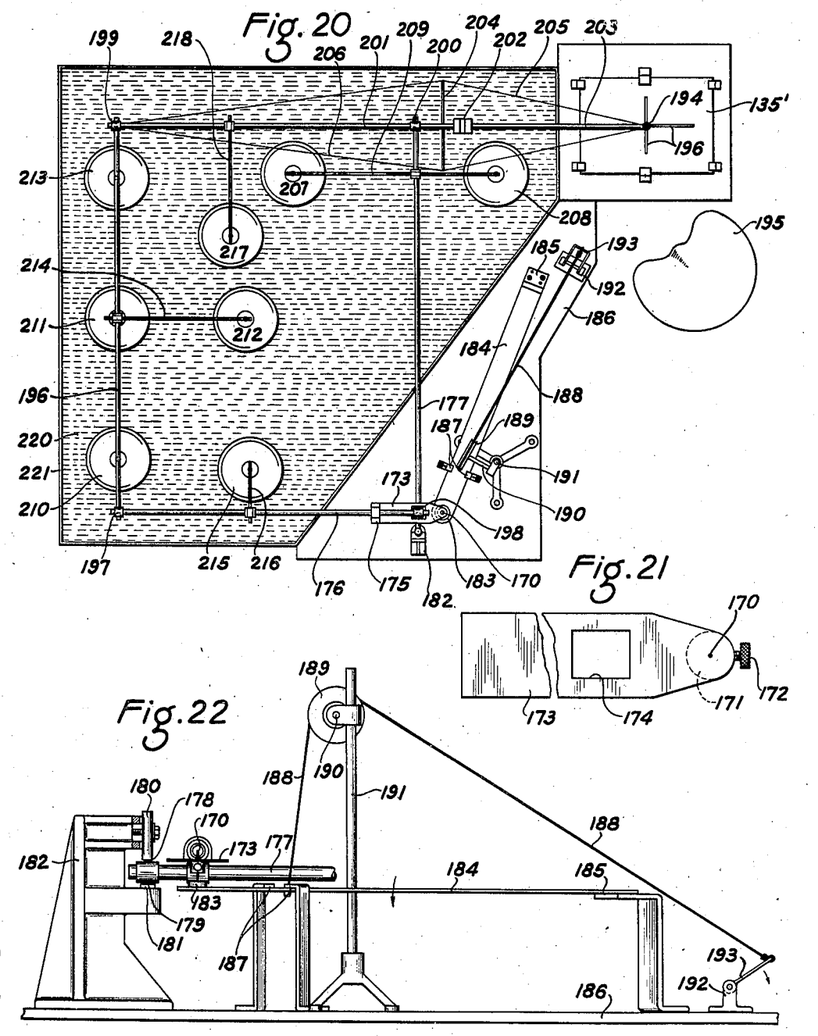
Fig. 20 is a top plan view of a second embodiment of my invention, certain parts being omitted for the sake of clearness.
Fig. 21 is an enlarged fragmentary detail showing the engraving tool carrying member.
Fig. 22 is an enlarged side elevation showing the relation of the engraving tool and the workholding structure.

While I have described a preferred embodiment of my engraving machine which is provided with the double set of transverse link construction, I can also provide a simplified pantograph with a single set of links as shown in Fig. 20. The apparatus shown in this figure is somewhat less accurate than the apparatus which has been previously described, but nevertheless satisfactory work for many purposes can be done with this embodiment of my invention. Referring to Fig. 20, a simplified pantograph may consist of approximately one-half of the parts shown in the double type pantograph of Fig. 1. Thus, the engraving tool 170 may be carried by a support 171 in which it may be held by a setscrew 172, as shown in Fig. 21, the support 171 in turn being carried by the plate 173 which is provided with a cutout 174. Plate 173 is supported by the block 175 which extends upwardly from the end of plate 173 and encircles the pantograph arm 176. There is a slight spring action downwardly on the arm 173, the downward movement being limited by the transverse arm 177 which is pivoted on the balls 178 and 179 supported by the rod 180 and the block 181, both being carried by the upwardly extending frame casting 182. This pivotal support may be exactly the same as that previously described in connection with Fig. 8.

The work 183 may be carried by a spring arm 184 attached to the member 185 supported by a portion of the frame 186. This spring arm is normally thrust downwardly away from the stops 187, as best shown in Fig. 22. In order to hold the work 183 in engraving position, a cable 188 is attached to the arm 184 and passes over a sheave 189 pivotally supported at 190 on an upstanding rod 191. The other end of the cable 188 is attached to a hand lever 193 pivoted on the bracket 192 adjacent a chair 195 (Fig. 20) on which the operator may sit so that his left hand may engage the hand lever 193 while his right hand may move the stylus 194 over the master plate 135' which is grooved at 196 with the pattern to be engraved on a reduced scale on the work 183.

The pressure of the engraving tool 170 on the work 183 is determined by the downward pressure of the spring arm 173, since an operator by moving the hand lever 193 downwardly holds the spring arm 184 upwardly against the stops 187 during the engraving operation. Each time the stylus is to be moved vertically, the operator permits the hand lever 193 to rotate in a counter-clockwise direction with respect to Fig. 22. This permits the work 183 to be lowered away from the engraving tool 170. The handle 193 must be held in its lowermost position during all of the time in which the engraving needle is to cut through the wax coating on the work 183.

The pantograph consists of the transverse levers 177 and 196 which are pivotally attached to the pantograph lever 176 by pivotal connections at 197 and 198. These connections need not be described in detail because they are the same as the pivotal connections shown in Figs. 15 and 18—that is the pantograph arms are provided with sleeves having counter-sunk areas in which pivots in the form of balls 49 are used.

The purpose of a cutout 174 in the spring arm 173 is to permit the sleeves 197 and 198 to pass through the spring arm without touching the parts of the pivotal connection.

The pantograph arms 177 and 196 have pivotal connections at 199 and 200 with a single joined connecting link 201. This connecting link has a hinge at 202 like the hinge described in connection with Fig. 16 which will permit vertical movement of the link section 203 relative to 201 when a stylus 194 carried on the end of the link 203 is moved verticallly. The link sections 201 and 203 are reenforced against sidewise movement by means of a bracing rod 204 passing through link 203 and supporting two guy wires 205 and 206, these wires being connected to the opposite ends of the links 201 and 203.

The transverse links 196 and 177 are both supported by floats, link 177 by the float 207 and 208 carried by the transverse arm 209 supported on link 177. Link 196 is supported by the floats 210, 211, 212, and 213. Floats 211 and 212 are carried by a transverse rod 214.

Link 176 has a single float 215 carried by the transverse rod 216 and link 201 has a single float 217 carried by the transverse rod 218. Since all of these floats are substantially like the float shown in Fig. 14 and may support the links of the pantograph in the same manner, it is unnecessary to describe them further except to point out that in this instance all of the floats may be supported by a fluid such as oil or water 220 in a single tank 221.

The operation of the second embodiment of my invention is somewhat more difficult than that of the preferred embodiment because it requires somewhat more skill on the part of the operator. The operator sits in the seat 195 with his right hand on the stylus 194 and his left hand on the hand lever 193. Assuming that work 183 has been mounted on the arm 184, the operator moves the stylus to a starting position on the master plate 135', which is normally at one end of one of the slots 196. He then very slowly and gently moves the hand lever 193 in the direction shown by the arrow in Fig. 22, thus causing the work 183 to move slowly upwardly into contact with the engraving tool 170 and until the arm 184 has come up against the stops 187. When this position is reached the downward pressure on the engraving tool 170 is controlled by the spring arm 173. The operator then moves the stylus 194 through its path and when the end of a slot is reached or when a different part of the pattern is to be engraved the hand lever 193 is moved slowly in a reverse direction from that shown by the arrow in Fig. 22, thus permitting the arm 184 to move the work 183 away from the engraving tool or needle 170.

An important feature of both forms of my invention is that all of the contact points are kept in the same horizontal plane. That is, the various pivotal points which are formed by the hardened steel balls between the phtoograph sections are all preferably in the same horizontal plane and this is also true of the engraving tool and the stylus. Thus if this plane is accurately maintained and if the various links of the pantograph are prevented from turning or twisting relative to each other, a high degree of accuracy in the movement of the various parts can be obtained, particularly where careful workmanship is employed. Since the pantograph links are supported on floats and the floats are adjustable relative to the links, it is a comparatively simple matter after the first setup has been made to maintain the various links in such a position that all the bearings will lie in the same plane.

I claim:

1. A pantograph for connecting the stylus and engraving tool of an engraving machine and comprising a plurality of hinged links connecting the stylus and engraving tool, each of said hinges comprising a pair of spaced bearing members one carried by each link, each pair of bearing members including facing countersunk portions and a single ball lying in both countersunk portions on which one link may turn relatively to another, and means spaced from the hinges for holding the counter-sunk portions in vertical alignment.

2. A pantograph for connecting the stylus and engraving tool of an engraving machine and comprising a plurality of hinged links connecting the stylus and engraving tool, each of said hinges comprising a pair of spaced bearing members one carried by each link, each pair of bearing members including facing countersunk portions and a single ball lying in both countersunk portions, means separate from the hinge for holding the counter-sunk portions in vertical alignment, the weight of one link holding the ball in the countersunk bearing portion of the link on which it rests.

3. A pantograph for connecting the stylus and egnraving tool of an engraving machine and comprising a plurality of hinged links connecting the stylus and engraving tool, certain links lying over other links, hinges between the links including bearing members, a countersunk portion in each bearing member and a single ball lying in the two countersunk portions, means spaced from the hinges for holding the countersunk portions in vertical alignment, the weight of the overlying links forming the sole means for holding the ball forming the hinge between the the two countersunk areas of the bearing members in place.

4. An engraving machine including a pantograph, a stylus carried thereby, an engraving tool operable by the pantograph, said pantograph comprising a linkage, a support, a pair of transverse links included in the linkage and hinged to the machine, a link included in the linkage connecting said transverse links and hinged thereto, said connecting link including centrally thereof a stylus holder, and flexible elements inserted in the connecting link on each side of the stylus holder, whereby the connecting link may cause the flexible elements to flex when said stylus is moved vertically.

5. An engraving machine including a pantograph, a stylus carried thereby, an engraving tool operable by the pantograph, said pantograph comprising a linkage, a support, a pair of transverse links included in the linkage and hinged to the support, a link included in the linkage connecting said transverse links and hinged thereto, said connecting link including centrally thereof a stylus holder, and flexible elements inserted in the connecting link on each side of the stylus holder, comprising flat leaf springs adapted to flex vertically but not horizontally to permit vertical movement of the stylus.

6. An engraving machine including a pantograph, a stylus carried thereby, an engraving tool operable by the pantograph, said pantograph comprising a linkage, a support, a pair of transverse links included in the linkage and hinged to the support, a link included in the linkage connecting said transverse links and hinged thereto, said connecting link including centrally thereof a stylus holder and flexible elements inserted in the connecting link on each side of the stylus holder comprising flat leaf springs adapted to flex vertically but not horizontally to permit vertical movement of the stylus, and means attached to said connecting link to prevent any but vertical flexing of the flexible members.

7. An engraving machine including a pantograph, a stylus carried thereby, an engraving tool operable by the pantograph, said pantograph comprising a linkage, a support, a pair of transverse links included in the linkage and hinged to the support, a link included in the linkage connecting said transverse links and hinged thereto, said connecting link including centrally thereof a stylus holder, and flexible elements inserted in the connecting link on each side of the stylus holder, comprising a flat leaf spring of a width greater than that of the connecting link, and extending horizontally to permit only vertical flexing of the springs and a hinge in the center of the connecting member.

8. A pantograph for connecting the stylus and engraving tool of an engraving machine and comprising a linkage including transverse links hingedly mounted to the frame of the machine, a connecting link hingedly attached to the transverse links and having a hinge in the center, a moveable frame carrying the engraving tool, links included in the linkage pivotally attached to the moveable frame, said links being hingedly attached to the transverse links to be moved thereby when the connecting link is moved by the stylus, said transverse links lying substantially in one plane, said connecting link and said links pivotally attached to the moveable frame at least partially overlying the transverse links, said hinge connections comprising facing countersunk recesses carried by said links and balls lying in said recesses, each hinge turning on a single ball, and means separate from the hinges for holding the counter-sunk recesses in vertical alignment.

9. A pantograph for connecting the stylus and engraving tool of an engraving machine and comprising a linkage including transverse links hingedly mounted to the frame of the machine, a connecting link hingedly attached to the transverse links and having a hinge in the center, a moveable frame carrying the engraving tool, links included in the linkage pivotally attached to the moveable frame, said links being hingedly attached to the transverse links to be moved thereby when the connecting link is moved by the stylus, said transverse links lying substantially in one plane, said connecting link and said links pivotally attached to the moveable frame at least partially overlying the transverse links, said hinge connections comprising facing countersunk recesses carried by said links and balls lying in said recesses, each hinge turning on a single ball, and means separate from the hinges for holding the counter-sunk recesses in vertical alignment, the balls being retained in position solely by the weight of the links overlying the transverse links.

10. An engraving machine including, in combination, an engraving tool, a stylus, and a movement multiplying linkage therebetween, said linkage including transverse links in parallel pairs, a connecting link hingedly attached to the pairs of parallel links, one of each pair of parallel links being pivotally mounted on the frame of the machine, a mount for said stylus on the connecting link at the center thereof and a hinge in the center of said link, means forming a part of said connecting link whereby the part thereof carrying the stylus can be moved vertically without disturbing the linkage as a whole, an engraving tool carrying frame, frame carrying links pivoted thereto and forming part of the linkage, hinge connections between the frame links and the transverse links whereby the engraving tool carrying frame may be moved by said stylus through said linkage, and means for supporting the multiplying linkage on floats moveable in an oil bath.

11. An engraving machine including, in combination, an engraving tool, a stylus, and a movement multiplying linkage therebetween, said linkage including transverse links in parallel pairs, a connecting link hingedly attached to the pairs of parallel links, one of each pair of parallel links being pivotally mounted on the frame of the machine, a mount for said stylus on the connecting link at the center thereof and a hinge in the center of said link, means forming a part of said connecting link whereby the part thereof carrying the stylus can be moved vertically without disturbing the linkage as a whole, an engraving tool carrying frame, frame carrying links pivoted thereto and forming part of the linkage, hinge connections between the frame links and the transverse links whereby the engraving tool carrying frame may be moved by said stylus through said linkage, and means for totally supporting the linkage on floats with the exception of the pivotal mounts of the transverse links.

12. An engraving machine, having, in combination, a pantograph, a stylus connected to the pantograph, an engraving tool carried by the pantograph, said pantograph comprising a plurality of hinged links, and means for supporting said links comprising floats connected to said links, and a tank of fluid supporting said floats.

13. An engraving machine, having, in combination, a pantograph, a stylus connected to the pantograph, an engraving tool carried by the pantograph, said pantograph comprising a plurality of hinged links, and means for supporting said links, comprising floats, a post extending upwardly from each float and connected to a link, and a tank of fluid to support the floats.

14. An engraving machine, having, in combination, a pantograph, a stylus connected to the pantograph, an engraving tool carried by the pantograph, said pantograph comprising a plurality of hinged links, and means for supporting said links comprising floats, a post extending upwardly from each float and connected to a link, and a tank of fluid to support the floats, a cross bar carried by at least some links, floats carried at each end of the cross bar to prevent rotative movement of said link relative to said linkage.

15. An engraving machine, having, in combination, a pantograph, a stylus connected to the pantograph, an engraving tool carried by the pantograph, said pantograph comprising a plurality of hinged links, and means for supporting said links comprising floats connected to said links, a moveable frame, engraving tools carried by said frame, a plurality of floats supporting said frame, hinge connections between the frame and pantograph linkage, and a fluid support for all of the floats of the linkage and frame.

16. An engraving machine including, in combination, a pantograph linkage, a connecting link hingedly attached to certain other links of the linkage, said connecting link including two sections hinged together, a stylus carried at the hinge, each section comprising outer and inner sections, the outer sections including float supports tending to prevent rotative movement, a flexible spring plate of greater width than the links connecting the two outer sections with the two inner sections permitting flexing of the inner sections at their hinge connection in a vertical direction, cross bars carried near the flexible spring plates, and wires connecting the ends of each inner and outer sections and the ends of the cross bars preventing flexure of the inner and outer sections in a direction other than vertical about said spring plates.

17. An engraving machine including, in combination, a pantograph linkage, a connecting link hingedly attached to certain other links of the linkage, said connecting link including two sections hinged together, a stylus carried at the hinge, each section comprising outer and inner sections, the outer sections including float supports tending to prevent rotative movement, a flexible spring plate of greater width than the links connecting the two outer sections with the two inner sections permitting flexing of the inner sections at their hinge connection in a vertical direction, cross bars carried near the flexible spring plates, and wires connecting the ends of each inner and outer sections and the ends of the cross bars preventing flexure of the inner and outer sections in a direction other than vertical about said spring plates and a counterbalance for the stylus adjacent the hinged connection of the inner sections of said connecting link.

18. An engraving machine including, in combination, a pantograph linkage, a stylus connected thereto to move the linkage, an engraving tool, a frame carrying the engraving tool, floats connected to and supporting the frame, frame moving links hingedly attached to the frame included in said linkage, transverse links hingedly attached to said frame carrying links included in said linkage, two pivotal mounts carried by the engraving machine supporting two transverse links, and including countersunk bearings supporting a ball as a pivot, the hinge connection between said frame and each of the frame moving links consisting of a countersunk bearing and a groove V-shaped in cross section supporting a ball as a pivot, whereby said frame may be moved through the same pattern as the stylus through said pantograph linkage but on a different scale.

19. An engraving machine including, in combination, a pantograph linkage, a stylus connected thereto to move the linkage, an engraving tool, a floating frame carrying the engraving tool, a reservoir of fluid on which said frame is floated, frame moving links hingedly attached to the frame included in said linkage, transverse links hingedly attached to said frame carrying links included in said linkage, two pivotal mounts carried by the engraving machine supporting two transverse links, and including countersunk bearings supporting a ball as a pivot, the hinge connection between said frame and each of the frame moving links, consisting of a countersunk bearing and a groove V-shaped in cross section supporting a ball as a pivot, whereby said frame may be moved through the same pattern as the stylus through said pantograph linkage but on a different scale, floats supporting the entire pantograph linkage on said reservoir of fluid with the exception of the pivotal mounts for the transverse links whereby friction may be reduced to a minimum.

20. An engraving machine including, in combination, a pantograph linkage, a stylus connected thereto to move the linkage, an engraving tool, a floating frame carrying the engraving tool, frame moving links hingedly attached to the frame included in said linkage, transverse links hingedly attached to said frame carrying links included in said linkage, two pivotal mounts carried by the engraving machine supporting two transverse links and including countersunk bearings supporting a ball as a pivot, the hinge connection between said frame and each of the frame moving links consisting of a countersunk bearing and a groove V-shaped in cross section supporting a ball as a pivot, whereby said frame may be moved through the same pattern as the stylus through said pantograph linkage but on a different scale, floats supporting the entire pantograph linkage with the exception of the support the transverse links derive from the pivotal supports, each float comprising a flanged pan, a rod attached centrally of the pan extending upwardly to a link, means for adjustably carrying the link on the rod, and a fluid tank positioned to receive and support each float on fluid contained in the tank.

21. An engraving machine including a stylus, an engraving tool and a movement multiplying linkage therebetween, said linkage including transverse links hingedly mounted to the frame of the machine, a connecting link hingedly attached to the transverse links and having a hinge in the center, a movable frame carrying the engraving tool, links included in the linkage pivotally attached to the movable frame, said links being hingedly attached to the transverse links to be moved thereby when the connecting link is moved by the stylus, and means forming a part of said connecting link for moving the stylus vertically without moving the hinged connections between the connecting link and the transverse links, and means independent of the pantograph linkage to move the engraving tool vertically.

22. An engraving machine including a stylus, an engraving tool and a movement multiplying linkage therebetween, said linkage including transverse links hingedly mounted to the frame of the machine, a connecting link hingedly attached to the transverse links and having a hinge in the center, a movable frame carrying the engraving tool, links included in the linkage pivotally attached to the movable frame, said links being hingedly attached to the transverse links to be moved thereby when the connecting link is moved by the stylus, and means forming a part of said connecting link for moving the stylus vertically without moving the hinged connections between the connecting link and the transverse links, and means independent of the pantograph linkage to cause a relative vertical movement between the engraving tool and the work, said independent means including a control member positioned near the stylus to be moved by an operator.

ARTHUR B. SIMMONS.